US008386682B2

(12) United States Patent
Yeem et al.

(10) Patent No.: US 8,386,682 B2
(45) Date of Patent: Feb. 26, 2013

(54) METHOD, APPARATUS AND SYSTEM FOR MAINTAINING TRANSACTION COHERECY IN A MULTIPLE DATA BUS PLATFORM

(75) Inventors: Kah Meng Yeem, Penang (MY); Mikal C. Hunsaker, El Dorado Hills, CA (US); Darren L. Abramson, Folsom, CA (US); Raul N. Gutierrez, Folsom, CA (US); Khee Wooi Lee, Pulau Pinang (MY)

(73) Assignee: Intel Corporation, Santa Clara, CA (US)

( * ) Notice: Subject to any disclaimer, the term of this patent is extended or adjusted under 35 U.S.C. 154(b) by 279 days.

(21) Appl. No.: 12/827,684

(22) Filed: Jun. 30, 2010

(65) Prior Publication Data
US 2012/0005386 A1 Jan. 5, 2012

(51) Int. Cl.
*G06F 13/36* (2006.01)
*G06F 12/00* (2006.01)
(52) U.S. Cl. ......... 710/113; 710/240; 710/244; 710/306
(58) Field of Classification Search .................. 710/113, 710/306–315, 240–244
See application file for complete search history.

(56) References Cited

U.S. PATENT DOCUMENTS

| | | | | |
|---|---|---|---|---|
| 5,255,374 A * | 10/1993 | Aldereguia et al. | ........... | 710/113 |
| 5,546,546 A * | 8/1996 | Bell et al. | ....................... | 710/112 |
| 5,619,661 A * | 4/1997 | Crews et al. | .................. | 710/119 |
| 6,038,630 A | 3/2000 | Foster et al. | | |
| 6,047,339 A * | 4/2000 | Su et al. | .......................... | 710/56 |
| 6,070,205 A * | 5/2000 | Kato et al. | ..................... | 710/100 |
| 6,141,713 A | 10/2000 | Kang | | |
| 6,324,612 B1 * | 11/2001 | Chen et al. | .................... | 710/306 |
| 6,789,153 B1 * | 9/2004 | Stewart | ......................... | 710/306 |
| 6,952,747 B2 * | 10/2005 | Fujiwara et al. | .............. | 710/110 |
| 7,412,550 B2 * | 8/2008 | Joe et al. | ........................ | 710/110 |
| 2005/0114579 A1 | 5/2005 | Chen et al. | | |
| 2006/0095637 A1 * | 5/2006 | Hirayama et al. | ............ | 710/309 |
| 2008/0294824 A1 | 11/2008 | Chou | | |

OTHER PUBLICATIONS

"International Search Report and Written Opinion of the International Searching Authority for PCT Patent Application No. PCT/US2011/042367", (Feb. 23, 2012), Whole Document.

* cited by examiner

*Primary Examiner* — Brian Misiura
(74) *Attorney, Agent, or Firm* — Blakely, Sokoloff, Taylor & Zafman LLP

(57) ABSTRACT

Techniques for maintaining an order of transactions in a multi-bus computer architecture. In an embodiment, an arbitrator receives access requests from a plurality of requestors, each access request requesting a respective access to a bus. Based on an arbitration between the access requests—e.g. between those requestors providing the access requests—the arbitrator may generate a grant message which triggers a carrying of a first message on the first bus. In certain embodiments, the grant message further triggers another carrying of the first message on the second bus.

20 Claims, 7 Drawing Sheets

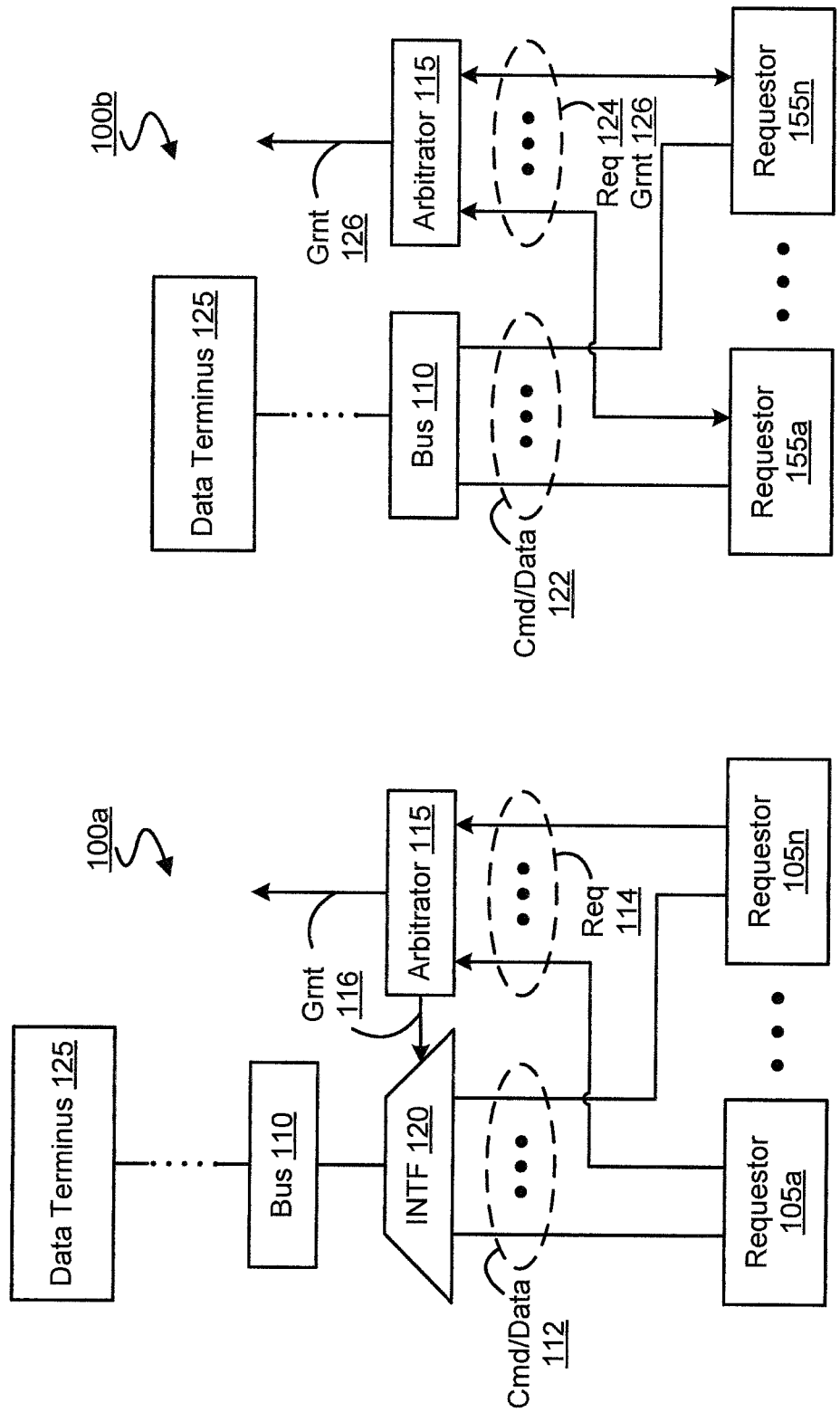

METHOD, APPARATUS AND SYSTEM FOR MAINTAINING TRANSACTION COHERECY IN A MULTIPLE DATA BUS PLATFORM

BACKGROUND

1. Technical Field

Embodiments of the invention relate generally to exchanging data in a computer platform. More particularly, certain embodiments relate to the granting of a bus access for a message exchange across multiple data buses of a computer platform.

2. Background Art

Computer architectures may, for various reasons, include multiple different hardware components which implement various respective operating bandwidths—e.g. operating frequencies. Such differences in operating bandwidths may be due to incorporation of legacy hardware components in a computer platform, for example. For efficient use of these different component bandwidths, a set of comparatively low bandwidth components may be separated from a set of comparatively high bandwidth components—e.g. by allocating the sets of components each to different respective data buses.

Such separation of high bandwidth and low bandwidth components from one another may pose problems for message exchanges in the architecture. For example, even though the high bandwidth and the low bandwidth bus are physically different buses, they may reside on the same logical bus segment regulated by a common sideband protocol.

If a sideband communication scheme regulates transactions on both of the two buses, this may impose a transaction coherency requirement. More particularly, logic interfacing the two buses may be required to maintain an order between transactions on the two buses so that their apparent order from some Global Observable Point (GOP) of the platform is the same as the order in which the individual transactions are respectively granted on their respective bus segments. For instance, if some agent A on a high bandwidth bus is granted a posted write transaction to the high bandwidth bus, and sends a sideband indication to an agent B on a low bandwidth bus, indicating that it has finished the transaction, any later transaction from agent B may need to be ordered behind agent A's granted transaction.

Such coherency problems in a multi-bus architecture have been solved by complex arbitration schemes on behalf of at least one of the multiple buses. For example, a first arbitrator of access requests for a first bus may have to be coupled to read information from a second arbitrator of access requests for a second bus. More particularly, the first arbitrator may be required to understand all transactions that have been granted by the second arbitrator, to re-arbitrate transaction requests from a bridge to the second bus and/or to dynamically maintain (e.g. reorder) request ordering between the bridge and components of the first bus. The imposition of such requirements on an arbitration scheme for a given bus has resulted in inefficiency and delay in overall transaction arbitration by such computer architectures, and has limited the scalability of such architectures.

BRIEF DESCRIPTION OF THE DRAWINGS

The various embodiments of the present invention are illustrated by way of example, and not by way of limitation, in the figures of the accompanying drawings and in which:

FIG. 1A is a block diagram illustrating select elements of a system for exchanging data on a data bus according to an embodiment.

FIG. 1B is a block diagram illustrating select elements of a system for exchanging data on a data bus according to an embodiment.

DETAILED DESCRIPTION

Figure 1C:
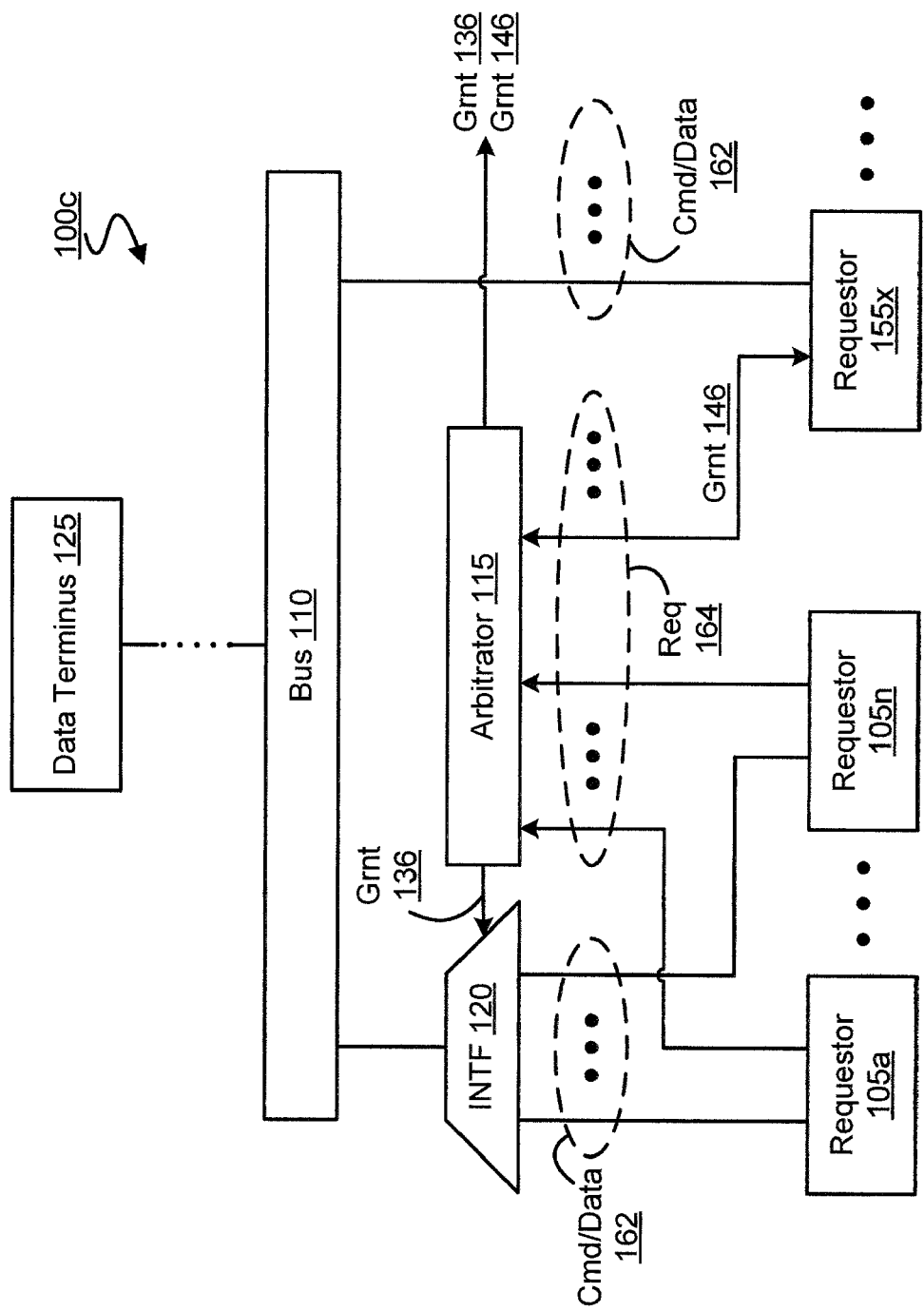
FIG. 1C is a block diagram illustrating select elements of a system for exchanging data on a data bus according to an embodiment.

In various embodiments, a first arbitrator may provide arbitration for a first plurality of requestors variously requesting respective access to a first bus. The first arbitrator may arbitrate among some or all of the first plurality of requestors, to select a first requestor for which an access request is granted. Based on the selecting, the first arbitrator may issue a first grant message indicating the granting of the access request of the first requestor. The first grant message may be provided to trigger a carrying of a first message by the first bus.

The carrying of the first message by the first bus may be for one stage of an exchange of the first message between the first requestor and a data terminus for a platform which includes the first requestor. In certain embodiments, the first grant message may also be provided to trigger a carrying of the first message by a second bus. The carrying of the first message by the second bus may be, for example, to implement another stage of the exchanging the first message between the first requestor and the data terminus.

In various embodiments, streaming buffer logic may be provided for information streaming to exchange the first message between the first bus and a second bus. In an embodiment, the streaming buffer logic may implement buffering of information exchanged by the first bus. The streaming buffer logic may further implement bandwidth translation in which a group of stream information is loaded to a streaming buffer at a rate which is different from a rate at which the group of stream information is offloaded from the streaming buffer.

Additionally or alternatively, grant order logic may be provided to queue respective access request grant messages from different arbitrators. In an embodiment, the grant order logic may receive and queue both the first grant message and a second grant message from a second arbitrator. The second grant message may be generated based on arbitration between a second plurality of requestors which vie with one another for access to the second bus.

In an embodiment, a grant message may be sent for queuing by the grant order logic only after end-to-end resources of the platform for the corresponding message exchange have been secured—e.g. allocated for access—in advance. In such an instance, neither the streaming buffer logic nor the grant order logic are required to re-arbitrate an already granted access request, as the end-to-end resource for the transaction have been identified by an arbitrator as pre-allocated.

Once respective grant messages have been received from the first and secondary arbitrators, the grant order logic will queue the grant messages in an order in which they are received. Such queuing may allow transaction coherency requirement of the platform to be addressed—e.g. where sets of components coupled respectively to the first and second bus operate under the same global observable point (GOP) of their platform.

FIG. 1A illustrates a high-level view of select elements in a system 100a for exchanging data according to an embodiment. System 100a may reside on a computer platform such as a desktop, laptop, handheld device, server, etc. In an embodiment, system 100a includes a data bus 110 to variously exchange respective messages for a plurality of requestors 105a, . . . , 105n coupled thereto. A requestor may include any entity of system 100a—e.g. implemented in software, firmware and/or hardware—operating as a data source which writes data and/or as a data sink which reads data. By way of illustration and not limitation, plurality of requestors 105a, . . . , 105n may include any of a variety of combinations of one or more processor cores, central processing units, drivers, virtual machines, threads, applications, instantiated object-oriented programming (OOP) objects, and the like.

In an embodiment, plurality of requestors 105a, . . . , 105n are all coupled to bus 110 via a common interface INTF 120. INTF 120 may include any of a variety of combinations of hardware, software and/or firmware to selectively exchange data with bus 110 at different times on behalf of different ones of plurality of requestors 105a, . . . , 105n. By way of illustration and not limitation, INTF 120 may provide a multiplexing functionality by which some or all of plurality of requestors 105a, . . . , 105n individually exchange with bus 110 respective command and/or data messages. The command and/or data messages exchanged by some or all of plurality of requestors 105a, . . . , 105n are represented collectively as the set of messages Cmd/Data 112.

In an embodiment, access to bus 110 by plurality of requestors 105a, . . . , 105n may be limited to access by one such requestor at a time. To manage such access to bus 110, an arbitrator 115 of system 100a may control how INTF 120 is to exchange selective ones of Cmd/Data 112. By way of illustration and not limitation arbitrator 115 may receive for each of Cmd/Data 112 a respective access request in a set of access requests Req 114 from plurality of requestors 105a, . . . , 105n. Each of Req 114 may request an exchange of a respective one of Cmd/Data 112 via bus 110.

At a given time, arbitrator 115 may arbitrate between the currently pending Req 114—e.g. by arbitrating between those of plurality of requestors 105a, . . . , 105n who sent the currently pending Req 114—to select a next access request for granting. Arbitration by arbitrator 115 may be according to any of a variety of combinations of arbitration techniques including, but not limited to, fixed priority arbitration, round robin, grant count arbitration, etc. In an embodiment, selecting a next access request to grant may be performed indirectly by selecting a next requestor to be given access rights for a message exchange with bus 110 via INTF 120. Arbitration between Req 114 by arbitrator 115 may be to select a requestor from among only plurality of requestors 105a, . . . , 105n.

By way of illustration and not limitation, a first requestor may send a first access request in Req 114 to request that a first message be carried on bus 110. The carrying of the first message on bus 110 may, for example, be part of an exchange of the first message between the first requestor and some data terminus 125 of system 100a which is coupled directly or indirectly to bus 110. Data terminus 125 may, for example, include a data storage device such as one or more of random access memory (RAM), read-only memory (ROM), flash memory, a cache, and the like. Alternatively or in addition, data terminus 125 may include other logic of a requestor. In an embodiment, data terminus 125 may include a network interface, input/output (I/O) interface, or other interface at a periphery of system 100a.

As a result of the arbitration by arbitrator 115, the first request may be selected as the next request to grant. Arbitrator 115 may generate a grant message Grnt 116 which is provided as a trigger for bus 110 carrying the first message. For example, Grnt 116 may include an identifier of the first requestor, an identifier of the first message, an identifier of a connection of the first requestor to INTF 120, or other identifier which triggers a recognition by INTF 120 that the first message is the next message to be carried on bus 110. In response to detecting Grnt 116, INTF 120 may read information from and/or write information to one or more bus lines of bus 110—e.g. on behalf of only the first requestor.

In an embodiment, arbitrator 115 may also provide Grnt 116 to other logic of system 100a. For example, Grnt 116 may also be provided to trigger one or more other stages in the exchange of the first message between the first requestor and data terminus 125. For each of multiple access requests granted, arbitrator 115 may provide a respective grant message both to INTF 120 and to other logic of system 100a.

FIG. 1B illustrates a high-level view of select elements in a system 100b for exchanging data according to an embodiment. System 100b may include some or all of the features of system 100a, for example. For the sake of brevity in describing certain additional and/or alternate features of various embodiments, system 100b is shown including bus 110, arbitrator 115 and data terminus 125. It is understood that system 100b may, in various embodiments include a different bus, arbitrator and/or data terminus.

In addition to—or in lieu of—plurality of requestors 105a, . . . , 105n, system 100b may include a plurality of requestors 155a, . . . , 155n coupled to bus 110. Some or all of plurality of requestors 155a, . . . , 155n may individually exchange with bus 110 respective command and/or data messages. The command and/or data messages exchanged by some or all of plurality of requestors 155a, . . . , 155n are represented collectively as the set of messages Cmd/Data 122. To manage access to bus 110 by plurality of requestors 155a, . . . , 155n, arbitrator 115 may receive for each of Cmd/Data 122 a respective access request in a set of access requests Req 124. Each of Req 124 may request an exchange of a respective one of Cmd/Data 122 via bus 110.

At a given time, arbitrator 115 may arbitrate between the currently pending Req 124—e.g. by arbitrating between those of plurality of requestors 155a, . . . , 155n who sent the currently pending Req 124—to select a next access request for granting. In an embodiment, selecting a next access request to grant may be performed indirectly by selecting a next requestor to be given access rights for a message exchange with bus 110. Arbitration between Req 124 by arbitrator 115 may be to select a requestor from among only plurality of requestors 155a, . . . , 155n.

By way of illustration and not limitation, consider an alternate scenario to that of system 100a—i.e. an alternate scenario in which the first requestor is one of plurality of requestors 155a, . . . , 155n. In such a case, the first access request may be sent to arbitrator 115 among Req 124. As a result of the arbitration by arbitrator 115, a first access request in Req 124 may be selected as the next request to grant. Arbitrator 115 may generate a grant message Grnt 126 which is provided as a trigger for bus 110 carrying the first message.

In an embodiment, plurality of requestors 155a, ..., 155n may each be coupled to bus 110 by a different respective link—e.g. via their own respective internal interfaces. In such a configuration for system 100b, Grnt 126 may be provided to the first requestor itself—e.g. via one of the paths by which Req 124 is provided to arbitrator 115.

Grnt 126 may include an identifier of the first requestor, an identifier of the first message, or other identifier which triggers recognition by the first requestor that the first message is the next message to be carried on bus 110. In response to detecting Grnt 126, the first requestor may read information from and/or write information to one or more bus lines of bus 110.

In an embodiment, arbitrator 115 may also provide Grnt 126 to other logic of system 100b. For example, Grnt 126 may also be provided to trigger one or more other stages in the exchange of the first message between the first requestor and data terminus 125. For each of multiple access requests granted, arbitrator 115 may provide a respective grant message both to a respective one of plurality of requestors 155a, ..., 155n and to other logic of system 100b.

FIG. 1C illustrates a high-level view of select elements in a system 100c for exchanging data according to an embodiment. System 100c may include some or all of the features of system 100a, for example. For the sake of brevity in describing certain additional and/or alternate features of various embodiments, system 100c is shown including plurality of requestors 105a, ..., 105n, bus 110, arbitrator 115, INTF 120 and data terminus 125. It is understood that system 100c may, in various embodiments include a different plurality of requestors, bus, arbitrator, interface and/or data terminus.

In system 100c, as discussed above with reference to system 100a, plurality of requestors 105a, ..., 105n are all coupled via INTF 120 for various message exchanges Cmd/Data 162 on bus 110. In an embodiment, the message exchanges Cmd/Data 162 may also include one or more other message exchanges of one or more additional requestors, represented in system 100c by requestor 155x. The one or more additional requestors may each be coupled to bus 110 by a different respective link—e.g. via their own respective internal interfaces.

Arbitrator 115 may receive respective access requests Req 164 from some or all of the plurality of requestors 105a, ..., 105n and from some or all of the one or more requestors represented by requestor 155x. Arbitrator 115 may repeatedly arbitrate between all pending Req 164 to select a next access request for granting. Based on the arbitrating, arbitrator 115 may send a grant message Grnt 136 to trigger an access of bus 110 by INTF 120 on behalf of one of plurality of requestors 105a, ..., 105n. Additionally or alternatively, arbitrator 115 may send an earlier or later grant message Grnt 146 to requestor 155x to trigger another access of bus 110.

In an embodiment, arbitrator 115 may also provide Grnt 136 and Grnt 146 to other logic of system 100c. For example, Grnt 136 and Grnt 146 may be provided, each to trigger one or more other stages in a respective message exchange. It is understood that each such message exchange may be to exchange messages with different respective data termini.

Figure 2:
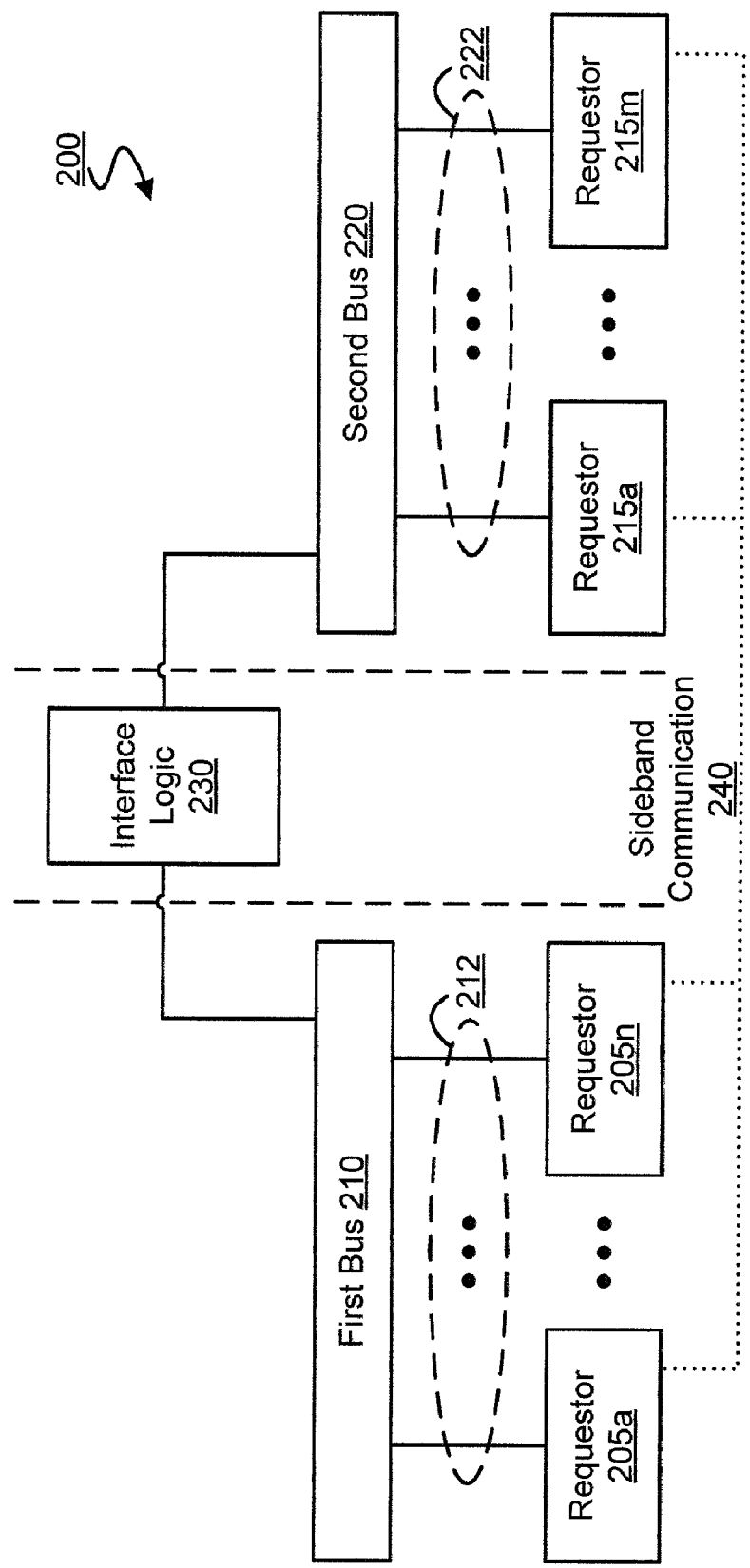
FIG. 2 is a block diagram illustrating select elements of a system including logic for interfacing multiple data buses according to an embodiment.

FIG. 2 illustrates a high-level view showing select elements of a system 200 for implementing multi-bus message exchanges according to an embodiment. System 200 may, for example, include some or all of the features in one or more of systems 100a, 100b, 100c. In an embodiment, system 200 resides on a computer platform—e.g. wherein a network interface such as a network interface card of the platform (not shown) is coupled directly or indirectly to at least one of the first bus 210 and the second bus 220, the network interface to couple system 200 to a network.

System 200 may include a first bus 210 to variously exchange respective messages for a first plurality of requestors 205a, ..., 205n coupled thereto. Although shown as coupled to first bus 210 by different respective links, it is understood that some of all of the first plurality of requestors 205a, ..., 205n may, in an alternate embodiment, be coupled to first bus 210 through a single common interface. For example, different couplings of certain ones of the first plurality of requestors 205a, ..., 205n to first bus 210 may be, in various embodiments, according to different ones of configurations in systems 100a, 100b, 100c.

System 200 may further include a second bus 220 to variously exchange respective messages for a second plurality of requestors 215a, ..., 215n coupled thereto. Although shown as coupled to second bus 220 by different respective links, it is understood that some of all of the second plurality of requestors 215a, ... 215n may, in an alternate embodiment, be coupled to second bus 220 through a single common interface. For example, different couplings of certain ones of the second plurality of requestors 215a, ... 215n to second bus 220 may be, in various embodiments, according to different ones of configurations in systems 100a, 100b, 100c.

In an embodiment, first bus 210 and second bus 220 may implement different operating bandwidths—e.g. operating frequencies—to accommodate different respective bandwidths (or bandwidth ranges) of first plurality of requestors 205a, ..., 205n and second plurality of requestors 215a, ... 215n. Additionally of alternatively, some or all of the transactions on first bus 210 and second bus 220 may be regulated using sideband communications 240 which are exchanged by first plurality of requestors 205a, ..., 205n and second plurality of requestors 215a, ... 215n.

Sideband communications 240 may impose transaction coherency requirements across first bus 210 and second bus 220. To conform to such coherency requirements, system 200 may include interface logic 230 between first bus 210 and second bus 220. In an embodiment, interface logic 230 provides functionality to aid in maintaining an order between transactions on first bus 210 and second bus 220—e.g. so that their apparent order from some Global Observable Point (GOP) of system 200 is the same as the order in which the individual transactions are respectively granted by first bus 210 or second bus 220. Interface logic 230 may include, for example, arbitration logic for either or both of first bus 210 and second bus 220.

Figure 3:
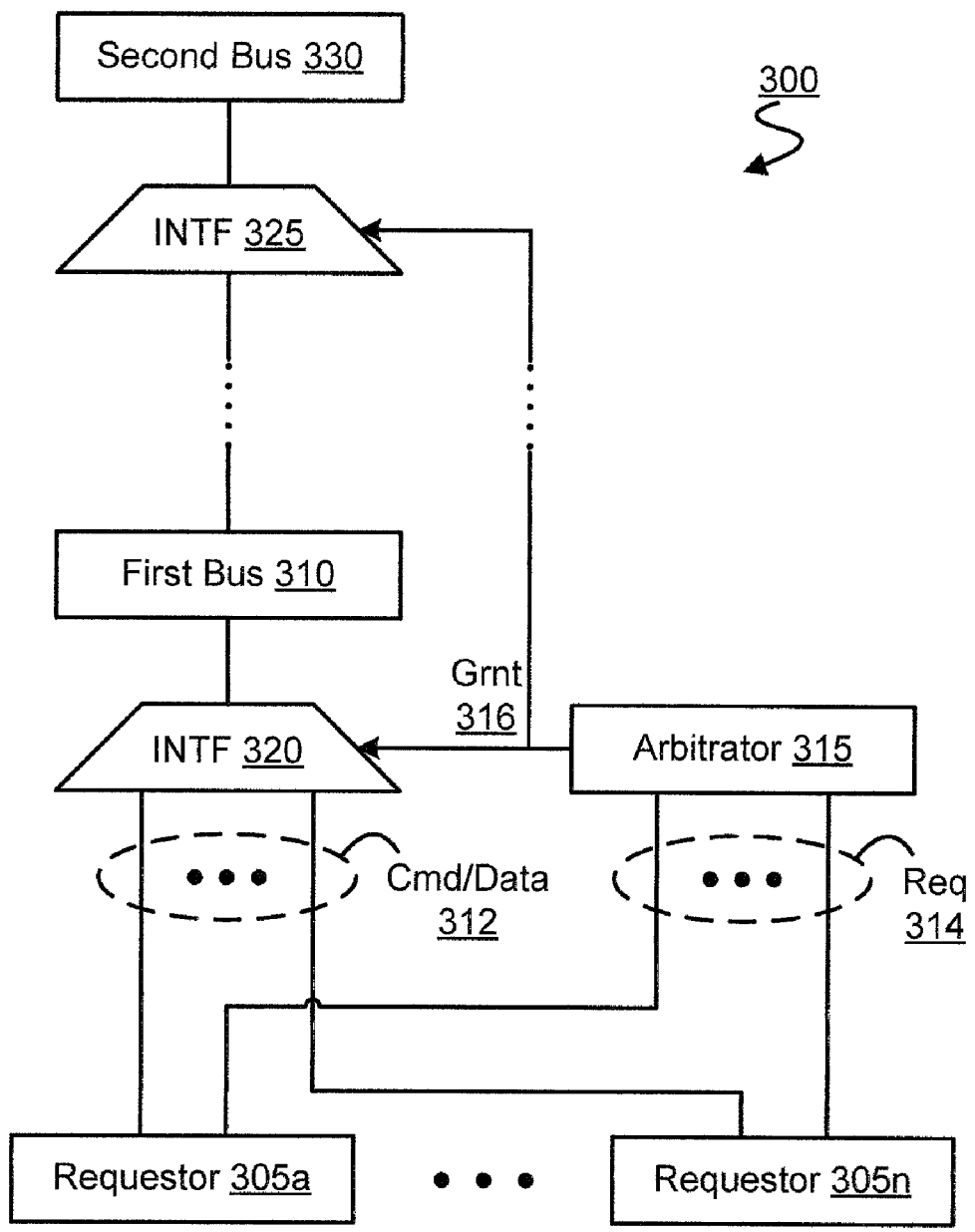
FIG. 3 is a block diagram illustrating select elements of a system for exchanging data via multiple data buses according to an embodiment.

FIG. 3 illustrates a high-level view of select elements in a system 300 for exchanging a message according to an embodiment. System 300 may include some or all of the features of system 200, for example.

System 300 may include a first bus 310 to variously exchange respective messages for a first plurality of requestors 305a, ..., 305n coupled thereto. Although shown as coupled to first bus 310 through a single common interface 320, it is understood that some of all of the first plurality of requestors 305a, ..., 305n may, in an alternate embodiment, be coupled to first bus 310 by different respective links. For example, different couplings of certain ones of the first plurality of requestors 305a, ..., 305n to first bus 310 may be, in various embodiments, according to different ones of configurations in systems 100a, 100b, 100c.

Some or all of plurality of requestors 305a, ..., 305n may variously exchange command and/or data messages Cmd/Data 312 via first bus 310—e.g. where access to first bus 310 is arbitrated by an arbitrator 315. Those of plurality of requestors 305a, ..., 305n which exchange Cmd/Data 312 may do so, for example, by sending access requests Req 314 to arbitrator 315. Based on the received Req 314, arbitrator 315 may arbitrate to select a next access request to grant. In an embodiment, operation of plurality of requestors 305a, ..., 305n, first bus 310, arbitrator 315, and INTF 320 may correspond to respective operation of plurality of requestors 105a, ..., 105n, bus 110, arbitrator 115, and INTF 120.

In response to arbitration between Req 314, arbitrator 315 may send a grant message Grnt 316 to trigger a carrying of a message on first bus 310. For example, Grnt 316 may be sent for INTF 320 to recognize a particular one of plurality of requestors 305a, ..., 305n on whose behalf INTF 320 is to exchange a message. In an alternate configuration, Grnt 316 may be provided to one of the plurality of requestors—e.g. where the granted access request is from a requestor which does not share a connection to first bus 310 with any other of plurality of requestors. In response to a detecting of Grnt 316, INTF 320—or in an alternate embodiment, the requestor receiving Grnt 316—may be triggered to read one of Cmd/Data 312 from, and/or write one of Cmd/Data 312 to, first bus 310.

The carrying of the message on first bus 310 may be part of an exchange of the message between one of plurality of requestors 305a, ..., 305n and some data terminus (not shown) of system 300. In an embodiment, the exchange of the first message further includes carrying the message on a second bus 330 of system 300. Second bus 330 may, for example, be coupled to first bus 310 by an interface INTF 325. In an embodiment, INTF 325 is an internal interface of a component which exchanges the message with first bus 310. In an alternate embodiment, INTF 325 may be external to such a component—e.g. where INTF 325 also provides functionality to interface one or more additional components (not shown) with second bus 325.

In addition to being provided to INTF 320 by arbitrator 315, Grnt 316 may be directly or indirectly provided to trigger a carrying of the exchanged message on second bus 330. For example, Grnt 316 may be sent for INTF 325 to recognize that it is to exchange the message on behalf of an intermediary component between first bus 310 and second bus 330. In various embodiments, INTF 325 may reside within such an intermediary component, or alternately operate as an interface for a plurality of requestors including such an intermediary component. In response to a detecting of Grnt 316, INTF 325 may be triggered to read one of Cmd/Data 312 from and/or write one of Cmd/Data 312 to second bus 330. It is understood that Grnt 316 may further be provided to trigger carrying of the exchanged messaged in any number of additional—e.g. third, fourth, etc.—buses (not shown), in various embodiments.

Figure 4:
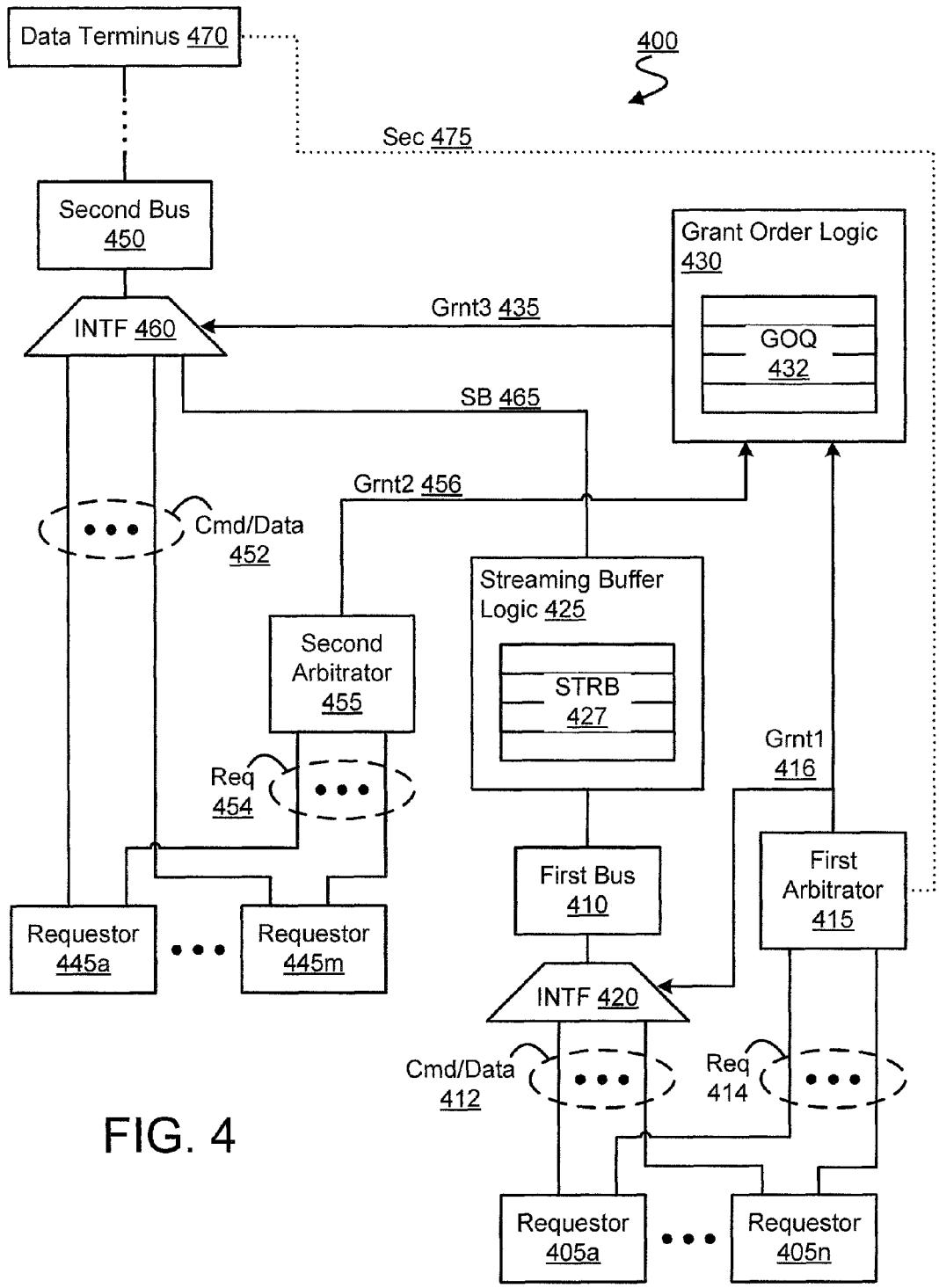
FIG. 4 is a block diagram illustrating select elements of a system for exchanging data via multiple data buses according to an embodiment.

FIG. 4 illustrates a high-level view of select elements in a system 400 for exchanging data according to an embodiment. System 400 may include some or all of the features of system 300, for example.

System 400 may include a first bus 410 to variously exchange respective messages for a first plurality of requestors 405a, ..., 405n coupled thereto. Although shown as coupled to first bus 410 through a single common interface 420, it is understood that some of all of the first plurality of requestors 405a, ..., 405n may, in an alternate embodiment, be coupled to first bus 410 by different respective links. For example, different couplings of certain ones of the first plurality of requestors 405a, ..., 405n to first bus 410 may be, in various embodiments, according to different ones of configurations in systems 100a, 100b, 100c.

Some or all of plurality of requestors 405a, ..., 405n may variously exchange command and/or data messages Cmd/Data 412 via first bus 410—e.g. where access to first bus 410 is arbitrated by an arbitrator 415. Those of first plurality of requestors 405a, ..., 405n which exchange Cmd/Data 412 may do so, for example, by sending access requests Req 414 to arbitrator 415. Based on the received Req 414, arbitrator 415 may arbitrate to select a next access request of first plurality of requestors 405a, ..., 405n to grant. In an embodiment, operation of first plurality of requestors 405a, ..., 405n, first bus 410, arbitrator 415, and INTF 420 may correspond to respective operation of first plurality of requestors 105a, ..., 105n, bus 110, arbitrator 115, and INTF 120.

In response to arbitration between Req 414, arbitrator 415 may send a grant message Grnt1 416 to trigger a carrying of a message on first bus 410. For example, Grnt1 416 may be sent for INTF 420 to recognize a particular one of first plurality of requestors 405a, ..., 405n on whose behalf INTF 420 is to exchange the message. In an alternate embodiment, Grnt1 416 may instead be provided to a requestor (not shown)—e.g. where the granted access request is from a requestor which does not share a connection to first bus 410 with any other of the arbitrated plurality of requestors. In response to a detecting of Grnt1 416, INTF 420—or in an alternate embodiment, the requestor receiving Grnt1 416—may be triggered to read one of Cmd/Data 412 from, and/or write one of Cmd/Data 412 to, first bus 410.

In an embodiment, the message carried by first bus 410 may be streamed to and/or streamed from streaming buffer logic 425 coupled to first bus 410. Streaming buffer logic 425 may include a streaming buffer STRB 427 to stream information in a particular direction toward or from first bus 410. Alternatively or in addition, streaming buffer logic 425 may include logic to receive and recognize a grant message as indicating that streaming buffer logic 425 is to stream information for carrying by first bus 410 or second bus 450. Streaming buffer logic 425 may further include another streaming buffer (not shown) to stream data in a direction opposite that of STRB 427.

The carrying of the message on first bus 410 may be part of an exchange of the message between one of first plurality of requestors 405a, ..., 405n and some data terminus 470 of system 400. In an embodiment, the exchange of the first message further includes carrying the message on a second bus 450 of system 400. Second bus 450 may, for example, be coupled to first bus 410 by an interface INTF 460. In an embodiment, INTF 460 provides functionality to interface second bus 450 with a second plurality of requestors 445a, ..., 445m and with a component of system 400—e.g. streaming buffer logic 425—which exchanges the message with first bus 410. Although shown as coupled to second bus 450 through a shared INTF 460, it is understood that some of all of the second plurality of requestors 445a, ..., 445m and streaming buffer logic 425 may, in an alternate embodiment, be coupled to second bus 450 by different respective links. For example, different couplings of certain ones of the second plurality of requestors 445a, ..., 445m and streaming buffer logic 425 to second bus 450 may be, in various embodiments, according to different ones of configurations in systems 100a, 100b, 100c.

In addition to being provided to INTF 420 by arbitrator 415, Grnt1 416 may be directly or indirectly provided to trigger a carrying of the exchanged message on second bus 450. For example, system 400 may include grant order logic 430 coupled to receive access request grant messages which have been generated by first arbitrator 415 to variously trigger the carrying of respective messages on first bus 410. In an embodiment, grant order logic 430 may receive Grnt1 416 directly or indirectly from first arbitrator 415.

Alternatively or in addition, grant order logic 430 may receive one or more access request grant messages 456 generated for the second plurality of requestors 445a, . . . , 445m. In an embodiment, some or all of second plurality of requestors 445a, . . . , 445m may variously exchange command and/or data messages Cmd/Data 452 via second bus 450—e.g. where access to second bus 450 by second plurality of requestors 445a, . . . , 445m is arbitrated by a second arbitrator 455. Those of second plurality of requestors 445a, . . . , 445m which exchange Cmd/Data 452 via second bus 450 may do so, for example, by sending access requests Req 454 to second arbitrator 455. Based on the received Req 454, second arbitrator 455 may arbitrate to select a next access request of second plurality of requestors 445a, . . . , 445m to grant. In an embodiment, operation of second plurality of requestors 445a, . . . , 445m, second bus 450, second arbitrator 455, and INTF 460 may correspond to respective operation of plurality of requestors 105a, . . . , 105n, bus 110, arbitrator 115, and INTF 120.

In response to arbitration between Req 454, second arbitrator 455 may send a grant message Grnt2 456 to trigger a carrying of a message on second bus 450. Grnt1 416 and Grnt2 456 may both be received at grant order logic 430 and placed in a grant order queue GOQ 432—e.g. according to an order in which they were received at grant order logic 430.

In an embodiment, grant order logic 430 may include logic to resolve an order of queuing Grnt1 416 and Grnt2 456 to GOQ 432 if the two grant messages are received at substantially the same time—e.g. during the same clock pulse of a timing clock of system 400. For example, a queuing priority for a grant message may be based on whether a subject of the grant message—i.e. an associated message to be exchanged by a requestor and carried on a bus—is a posted message, a non-posted message or a completion message.

As referred to herein, a posted message is one in which a sender thereof does not wait for a completion message from a receiver thereof. For example, a write command and/or its associated write data may be a posted message, at least insofar as the sender may send a write command and write data without awaiting any completion message from a receiver thereof. By contrast, a non-posted message is one in which the sender thereof will await a completion message from a receiver thereof. For example, a read command message may be a non-posted message, at least insofar as a sender may send a read command first, but must await the requested read data before completion is considered to have occurred. In an embodiment, the requested read data may be considered a completion message.

To resolve the queuing of grant messages received at substantially the same time, grant order logic 430 may give queuing priority to a grant message for a non-posted message exchange over a grant message for a posted message exchange. Additionally or alternatively, grant order logic 430 may give queuing priority to a grant message for a posted message exchange over a grant message for a completion message exchange.

Grant order logic 430 may include logic to generate a grant message Grnt3 435 which, at various times, will be equal to different grant messages which were previously queued in GOQ 432. In an embodiment, grant order logic 430 sequentially sends next most recently queued grant messages as Grnt3 435, and sequentially dequeues that next most recently queued grant message from GOQ 432.

Grnt3 435 may be sent for INTF 460 to recognize a particular one of second plurality of requestors 445a, . . . , 445m and of streaming buffer logic 425 on whose behalf INTF 460 is to exchange a message. In an alternate embodiment, Grnt3 435 may be provided to one of second plurality of requestors 445a, . . . , 445m and streaming buffer logic 425—e.g. where the granted access request indicated by Grnt3 435 is from a requestor which does not share a connection to second bus 450 with any other of second plurality of requestors 445a, . . . , 445m and streaming buffer logic 425. In response to a detecting of Grnt3 435, INTF 420—or in an alternate embodiment, the requestor receiving Grnt3 435—may be triggered to read from and/or write to second bus 450 a message from one of the sets of messages Cmd/Data 412 and Cmd/Data 452. Any one of Cmd/Data 412 which is carried on second bus 450 may be exchanged to/from second bus 450 as streaming buffer information SB 465. Bandwidth translation may be performed by streaming buffer logic 425, in which a group of stream information of SB 465 is loaded to STRB 427 at a rate which is different from a rate at which the group of stream information is offloaded from STRB 427. The difference in load/offload rate may be accommodated by second bus 460 only occasionally exchanging SB 465 with streaming buffer logic 425, while at other times exchanging messages of other requestors—e.g. ones of Cmd/Data 452.

INTF 420 may include logic to recognize that information is to be exchanged with streaming buffer logic 425 whenever Grnt3 435 indicates an access on behalf of one of first plurality of requestors 405a, . . . , 405n. In an alternate embodiment, a streaming buffer logic may include logic to receive grant messages which variously indicate respective ones of a plurality of requestors, where the streaming buffer logic variously recognizes from the grant messages that it is to exchange data on behalf of respective ones of the plurality of requestors.

In system 400, first bus arbitrator 415 and/or second bus arbitrator 455 may each behave like a grant scheduler that can schedule multiple grants to GOQ 432. In an embodiment, either or both of first bus arbitrator 415 and second bus arbitrator 455 may schedule grants to GOQ 432 only after it is determined that the end-to-end resources of the platform for the message exchange have been secured.

Figure 5:
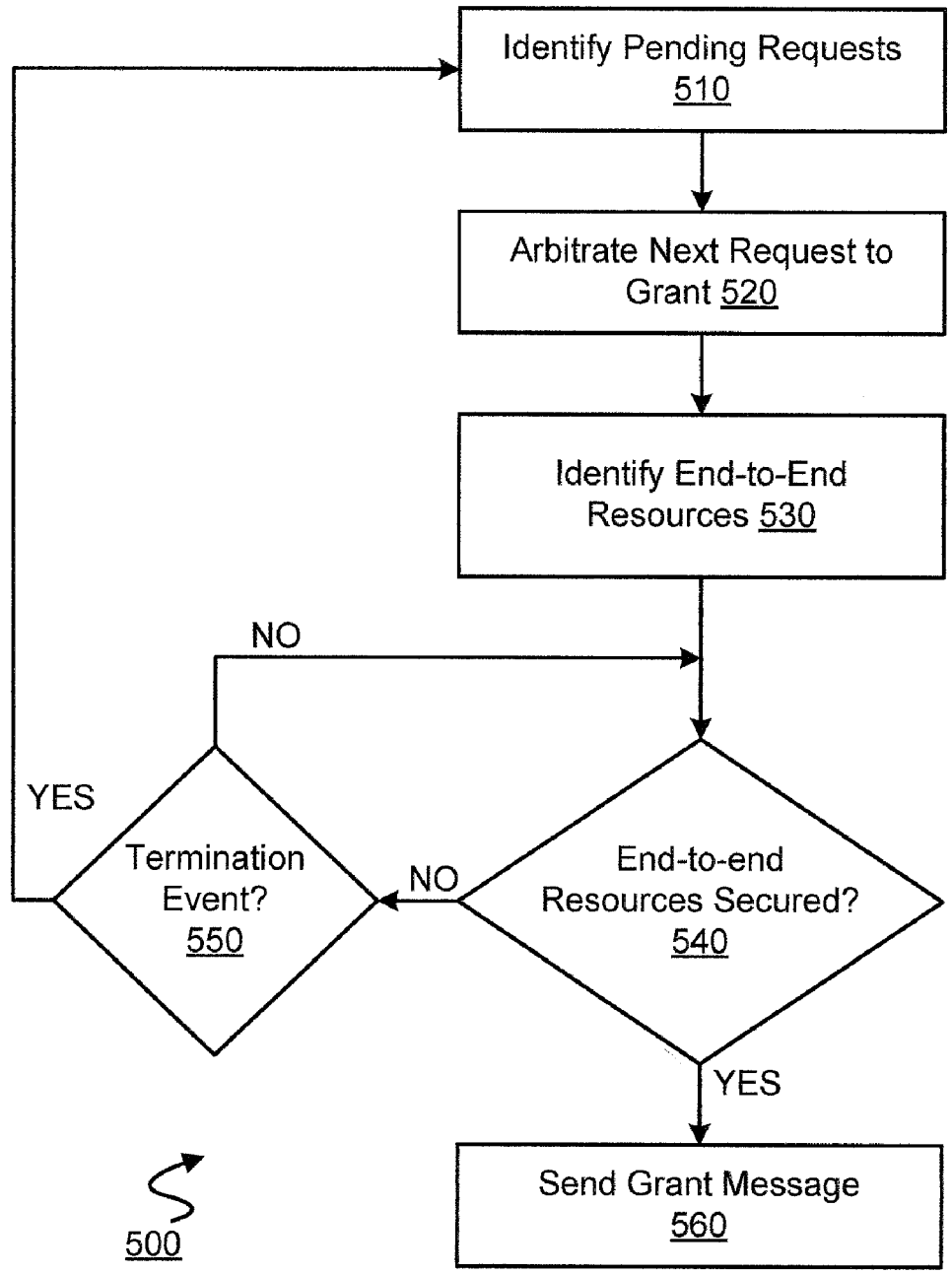
FIG. 5 is a flow diagram illustrating select elements of a method for generating, according to an embodiment, a message granting access to a data bus.

FIG. 5 illustrates select elements of a method 500 for providing an access request grant message, according to an embodiment. Method 500 may be performed, for example, by either or both of first bus 410 and second bus 450.

Method 500 may include, at 510, identifying all pending access requests from a group of requestors between which arbitration is to be performed. In an embodiment, each pending access request may identify or otherwise correspond to a respective command and/or data message exchange for which access to a bus is requested.

Based on the identified pending access requests, method 500 may, at 520, arbitrate between those of the plurality of requestors which provided the pending access requests. Arbitration among the pending access requests may be according to any of a variety of combinations of arbitration techniques including, but not limited to, fixed priority arbitration, round robin, grant count arbitration, etc. In an embodiment, the arbitration may be to select a requestor from among only the plurality of requestors.

In response to a result of the arbitration among the pending requests—e.g. based on a selecting of a next requestor for which an access request is granted—method 500 may identify, at 530, one or more end-to-end resources to be secured before scheduling a bus access corresponding to the access request to be granted. In an embodiment, identifying the end-to-end resources may be based on a path between the requestor and a data terminus with which the requestor is to exchange a message. Along such a path may reside one or more resources necessary for exchanging the message between the requestor and the data terminus—e.g. where some or all of the one or more resources may at various times have limited or no ability to facilitate such exchange. In an embodiment, such end-to-end resources may include any of a variety of buffers, queues, drivers, interfaces, etc.

Based on the identified end-to-end resources, a determination may be made, at 540, as to whether all of the required end-to-end resources for the message exchange have been secured. By way of illustration and not limitation, in an embodiment where method 500 is performed by first arbitrator 415, a secure message Sec 475 may be provided directly or indirectly to first arbitrator 415, where Sec 475 indicates the data terminus 470 has been secured for the message exchange associated with the granted access request. It is understood that first arbitrator 415 may directly or indirectly receive one or more other such secure messages (not shown), the one or more other such secure messages indicating a securing of one or more other resources between data terminus 470 and one of first plurality of requestors 405*a*, . . . , 405*n*. Alternatively or in addition, one or more other secure messages may be provided to second arbitrator 455 for the scheduling of transactions granted by second plurality of requestors 445*a*, . . . , 445*m*.

Method 500 may repeatedly perform the determination at 540—e.g. based on an occasional determination at 550 as to whether a termination event indicates an end to such repeated determinations. Such a termination event may include, for example, a timeout, a count of total determinations at 540, and/or an indication that an availability of one or more resources is below some threshold level of availability. In response to determining that a termination event has happened, method 500 may forego granting the access request which was selected by the arbitration at 520, and reevaluate the currently pending requests at 510 for another round of arbitration.

In response to determining that a termination event has not happened, method 500 may again determine at 540 whether all of the relevant end-to-end resources for the message exchange have been secured. If all such end-to-end resources are secured, then method 500 may, at 560, send a grant message 560 to trigger a carrying of the message on a bus for an exchange of the message between the requestor and the data terminus.

It is understood that the data terminus may only be a terminus from the point of view of a computer platform which is performing method 500. Similarly, the secured resources may be end-to-end resources only with respect to the computer platform. For example, a message exchanged between one of first plurality of requestors 405*a*, . . . , 405*n* and data terminus 470 may further be exchanged between data terminus 470 and other entities external to the system 400. However, transaction coherency requirements for such a transaction may not extend outside of system 400. Therefore, the maintaining of an order of transactions may only be required from the point of view of some GOP within system 400 by which a data terminus and an end-to-end resource are considered such.

It is understood that the particular sequence certain operations in method 500 may vary, according to various embodiments. For example, in an alternate embodiment, a set of determinations may be made for each of one or more pending access requests, each determination to identify whether the corresponding end-to-end resources for the respective access request have been secured. Identification may then be made, based on the set of determinations, of one or more access requests for which end-to-end resources are secured. Arbitration may then be performed to select an access request to be granted—e.g. wherein the access request is selected only from the identified one or more access requests having secured end-to-end resources.

Figure 6:
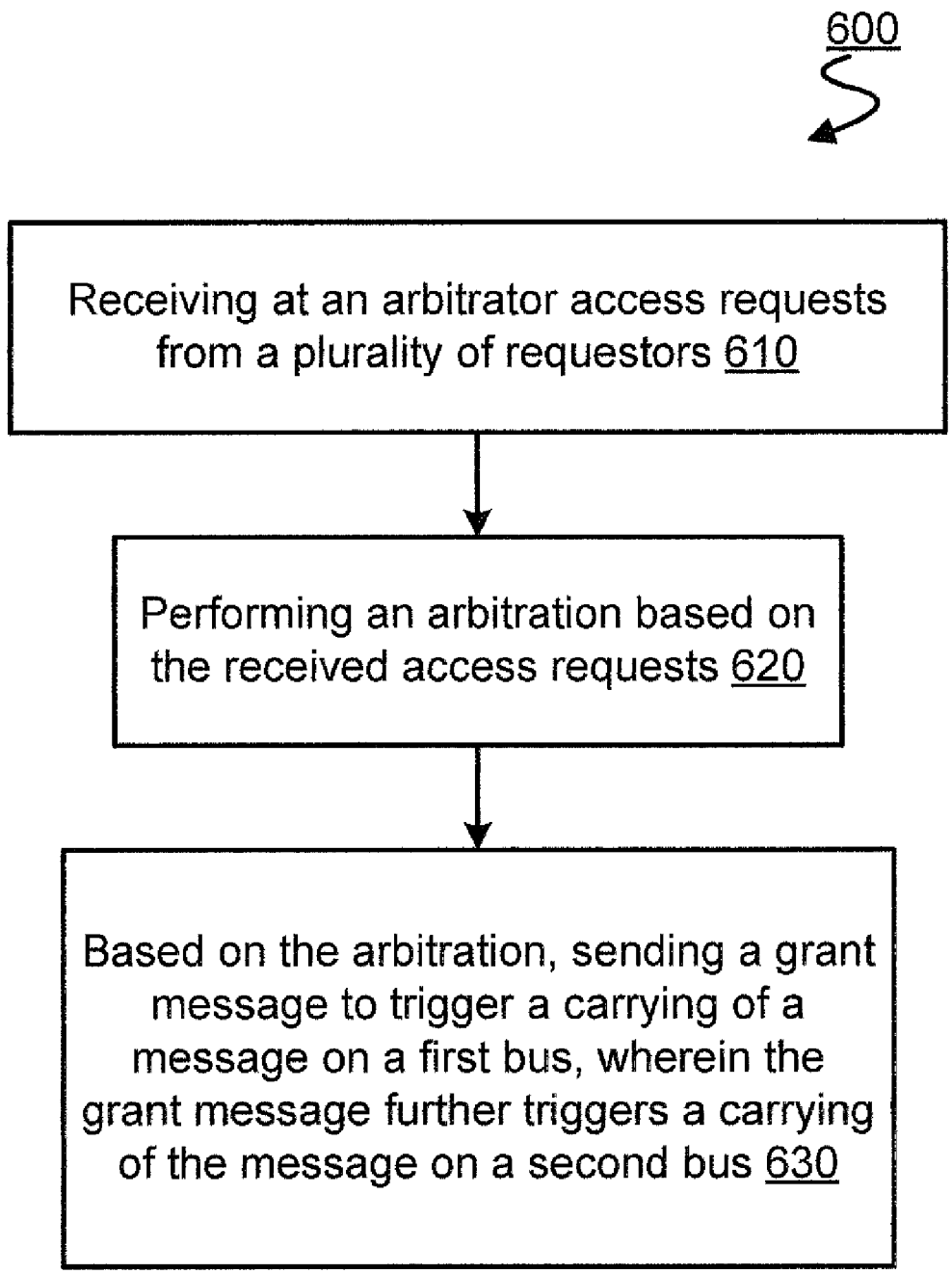
FIG. 6 is a flow diagram illustrating select elements of a method for exchanging a message on multiple data buses, according to an embodiment.

FIG. 6 illustrates select elements of a method 600 for exchanging a message, according to an embodiment. Method 600 may be performed, for example, by system 400. By way of illustration and not limitation, method 600 may include, at 610, receiving at an arbitrator access requests from a plurality of requestors. The arbitrator and plurality of requestors may include, respectively, first arbitrator 415 and plurality of requestors 405*a*, . . . , 405*n*.

Based on the received access requests, an arbitration may be performed, at 620. Performance of the arbitration may include selecting an access request to be granted. Arbitration may include arbitrating between the pending access requests and/or arbitrating between the respective requestors from which the access requests were received.

Based on the arbitration, method 600 may, at 630, send a grant message to trigger a carrying of a message on a bus—e.g. first bus 410. Moreover, the grant message may wherein the first grant message further triggers a carrying of the message on a second bus. The triggering of a carrying on a bus may be a sufficient condition for a bus and/or a device coupled to the bus to initiate a transferring of data to or from one or more lines of the bus. In an embodiment, the grant message may further trigger—e.g. independently of the first triggering—a carrying of the message on a second bus. In an embodiment, the carrying the message on the first bus and the carrying the message on the second bus may be part of different respective stages of an exchange of the message from a bus access requestor to some data terminus on a platform of the bus access requestor.

Techniques and architectures for communicating information in a multi-bus system are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions which follow are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, certain embodiments are not described with reference to any particular programming language. It will be appreciated that a variety of programming languages may be used to implement the teachings of certain embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus comprising:
a first bus;
a first plurality of requestors coupled to the first bus;
a first arbitrator to receive from the first plurality of requestors access requests which each request a respective access to the first bus, the first arbitrator further to perform a first arbitration based on the access requests, the first arbitration to select a first requestor of the first plurality of requestors, the first arbitrator further to send, based on the first arbitration, a first grant message to trigger a carrying of a first message on the first bus, the first message exchanged by the first requestor;
a second bus coupled to the first arbitrator, wherein the first grant message further to trigger a carrying of the first message on the second bus; and
a grant order queue to store the first grant message, the grant order queue further to provide the first grant message to trigger the carrying of the first message on the second bus.

2. The apparatus of claim 1, wherein the first arbitration is to select the first requestor from among only the first plurality of requestors.

3. The apparatus of claim 1, further comprising:
a streaming buffer to exchange the first message between the first bus and the second bus.

4. The apparatus of claim 1, further comprising:
the second bus;
a second plurality of requestors; and
a second arbitrator to receive from the second plurality of requestors access requests which each request a respective access to the second bus, the second arbitrator to provide to the grant order queue a second grant message based on an arbitrating of the second plurality of requestors received from the second plurality of requestors.

5. The apparatus of claim 3, wherein the streaming buffer to exchange data between the first bus and the second bus includes the streaming buffer to perform a bandwidth translation.

6. The apparatus of claim 1, wherein the first bus and the second bus operate at different respective frequencies.

7. A method comprising:
receiving at a first arbitrator access requests from a first plurality of requestors, each access request requesting a respective access to a first bus;
with the first arbitrator, performing a first arbitration based on the access requests from the first plurality of requestors, the first arbitration selecting a first requestor for which a first access request is granted, the first access request for an exchange of a first message by the first requestor;
based on the first arbitration, sending a first grant message from the first arbitrator, wherein the first grant message triggers a carrying of the first message on the first bus, and wherein the first grant message further triggers a carrying of the first message on a second bus for the exchange of the first message by the first requestor;
storing the first grant message in a grant order queue; and
with the grant order queue, providing the first grant message to trigger the carrying of the first message on the second bus.

8. The method of claim 7, wherein the first arbitration selecting the first requestor includes the first arbitration selecting the first requestor from among only the first plurality of requestors.

9. The method of claim 7, further comprising:
with a streaming buffer, exchanging the first message between the first bus and the second bus.

10. The method of claim 9, wherein exchanging the first message between the first bus and the second bus includes exchanging the first message perform a bandwidth translation for the exchanging.

11. The method of claim 7, further comprising:
receiving at a second arbitrator access requests from a second plurality of requestors, each access request from the second plurality of requestors requesting a respective access to the second bus; and
with the second arbitrator, providing to the grant order queue a second grant message based on an arbitrating of the second plurality of requestors received from the second plurality of requestors.

12. The method of claim 7, wherein the first bus and the second bus operate at different respective frequencies.

13. A computer-readable storage medium having stored thereon instructions which, when executed by one or more processors, cause the one or more processors to perform a method comprising:
receiving at a first arbitrator access requests from a first plurality of requestors, each access request requesting a respective access to a first bus;
with the first arbitrator, performing a first arbitration based on the access requests from the first plurality of requestors, the first arbitration selecting a first requestor for which a first access request is granted, the first access request for an exchange of a first message by the first requestor;
based on the first arbitration, sending a first grant message from the first arbitrator, wherein the first grant message triggers a carrying of the first message on the first bus, and wherein the first grant message further triggers a carrying of the first message on a second bus for the exchange of the first message by the first requestor;
storing the first grant message in a grant order queue; and
with the grant order queue, providing the first grant message to trigger the carrying of the first message on the second bus.

14. The computer-readable storage medium of claim 13, wherein the first arbitration selecting the first requestor includes the first arbitration selecting the first requestor from among only the first plurality of requestors.

15. The computer-readable storage medium of claim 13, the method further comprising:
with a streaming buffer, exchanging the first message between the first bus and the second bus.

16. The computer-readable storage medium of claim 15, wherein exchanging the first message between the first bus and the second bus includes exchanging the first message perform a bandwidth translation for the exchanging.

17. A system comprising:
a first bus;
a first plurality of requestors coupled to the first bus;
a first arbitrator to receive from the first plurality of requestors access requests which each request a respective access to the first bus, the first arbitrator further to perform a first arbitration based on the access requests, the first arbitration to select a first requestor of the first plurality of requestors, the first arbitrator further to send, based on the first arbitration, a first grant message to trigger a carrying of a first message on the first bus, the first message exchanged by the first requestor;
a second bus coupled to the first arbitrator, wherein the first grant message further to trigger a carrying of the first message on the second bus;
a network interface coupled to one of the first bus and the second bus; and
a grant order queue to store the first grant message, the grant order queue further to provide the first grant message to trigger the carrying of the first message on the second bus.

18. The system of claim 17, wherein the first arbitration is to select the first requestor from among only the first plurality of requestors.

19. The system of claim 17, further comprising:
a streaming buffer to exchange the first message between the first bus and the second bus.

20. The system of claim 17, further comprising:
the second bus;
a second plurality of requestors; and
a second arbitrator to receive from the second plurality of requestors access requests which each request a respective access to the second bus, the second arbitrator to provide to the grant order queue a second grant message based on an arbitrating of the second plurality of requestors received from the second plurality of requestors.

* * * * *